United States Patent [19]

Cuscurida et al.

[11] Patent Number: 4,609,685

[45] Date of Patent: Sep. 2, 1986

[54] POLYETHER POLYOLS MODIFIED WITH AMINO ALCOHOL-EPOXY RESIN ADDUCTS

[75] Inventors: Michael Cuscurida; Harold G. Waddill, both of Austin, Tex.

[73] Assignee: Texaco Inc., White Plains, N.Y.

[21] Appl. No.: 731,196

[22] Filed: May 6, 1985

[51] Int. Cl.$^4$ .............................................. C08G 18/14
[52] U.S. Cl. .................................... 521/167; 525/504; 528/88; 528/111; 528/361; 528/407
[58] Field of Search ........................ 521/167; 525/504; 528/88, 111, 361, 407

[56] References Cited

U.S. PATENT DOCUMENTS

| | | | |
|---|---|---|---|
| 3,872,116 | 3/1975 | Gipson | 564/477 |
| 4,352,920 | 10/1982 | Klugen | 528/111 |
| 4,471,138 | 9/1984 | Stogrgn | 564/477 |
| 4,495,369 | 1/1985 | Werner et al. | 564/480 |

*Primary Examiner*—Maurice J. Welsh

*Attorney, Agent, or Firm*—Jack H. Park; Kenneth R. Priem; Richard A. Morgan

[57] ABSTRACT

Polyether polyols are modified by reaction with alkylene oxides and amino alcohol-epoxy resin adducts. The adducts are the reaction product of an epoxy resin and amino alcohol of the formula:

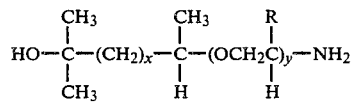

wherein:
x ranges from 1 to 4,
y ranges from 1 to 40, and
R is an alkyl of from 1 to 4 carbon atoms.

These polyether polyols are used to prepare flexible polyurethane foams.

20 Claims, No Drawings

POLYETHER POLYOLS MODIFIED WITH AMINO ALCOHOL-EPOXY RESIN ADDUCTS

BACKGROUND OF THE INVENTION

1. Field of the Invention

This invention relates to polyether polyols modified by reaction with amino alcohol-epoxy resin adducts and their use in the preparation of flexible polyurethane foams.

2. Description of the Prior Art

The use of a polyol in the preparation of polyurethanes by reaction of the polyol with a polyisocyanate in the presence of a catalyst and other ingredients is well known. Conventional polyols for flexible polyurethane foams are usually made by the reaction of a polyhydric alcohol with an alkylene oxide, usually ethylene oxide and/or propylene oxide, to an average molecular weight of about 2000 to 3000 and above. These polyols are then reacted with polyisocyanate in the presence of water or other blowing agents such as fluorocarbons to obtain polyurethane foams. Polyols have been modified in many ways in attempts to improve the properties of the resulting polyurethane.

U.S. Pat. No. 4,394,463 describes a rigid polyurethane foam produced from a modified amino polyol. The modified amino polyol was made by reaction of an initiator having a functionality greater than four with an amine, alkylene oxides and an epoxy resin as described in U.S. Pat. No. 4,309,532.

U.S. Pat. No. 4,373,034 describes a flexible polyurethane foam made from an epoxy resin modified polyol. The epoxy resin modified polyols were made as described in U.S. Pat. No. 4,316,991.

SUMMARY OF THE INVENTION

The invention concerns a modified amino polyol for use in preparing flexible polyurethane foams. These modified polyols are the reaction product of a flexible foam polyol initiator selected from the group of initiators having an active hydrogen functionality of from three to four; one or more alkylene oxides and an amino alcohol-epoxy resin adduct. The amino alcohol of the adduct is of the formula

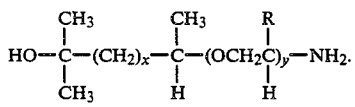

The adduct is added at selected points internally along the length of the polyol chain.

These modified amino polyols are reacted with an organic polyisocyanate and one or more suitable foam catalysts in the presence of a blowing agent.

DESCRIPTION OF THE PREFERRED EMBODIMENTS

The modified polyols of this invention may be made by reacting a flexible foam polyol initiator with one or more alkylene oxides to extend the polyol chain to a molecular weight of about 600. The amino alcohol-epoxy resin adduct is then added in such a manner that the epoxy resin is added at selected points internally along the length of the polyol chain. This tends to increase the overall functionality of the polyol chain. It is recommended that at least two equivalents of hydroxyl functionality be present per equivalent of amino alcohol-epoxy resin adduct added to the reaction mixture to avoid gelling by internal cross linking within the epoxy. The amino alcohol-epoxy resin adduct may be added during and/or after the addition of alkylene oxide to the polyol initiator. The best results are obtained if the resin is not added only as a "cap", that is, after all of the oxide has been added which results in the resin being attached to the end of the resulting polyol chain only. One skilled in the art can readily determine the best procedure with respect to when additions should be made and at what temperature and during which times the reaction mixture is to be heated within the scope of this invention.

It is well known that polyethers for polyurethane applications can be prepared by the base catalyzed reaction of propylene oxide with an initiator having a multi-hydrogen functionality, that is, containing from three to four reactive hydrogen atoms. Such initiators include, for example, glycerine, trimethylolpropane, 1,2,6-hexanetriol, pentaerythritol, triethanolamine, ethylenediamine and aminoethylpiperazine. If base catalysis is used, the alkaline catalysts normally employed are sodium hydroxide and potassium hydroxide. Other techniques to prepare polyols are known to those skilled in the art.

Polyether polyols having equivalent weights of up to about 750 are normally prepared in a one-step process by the reaction of propylene oxide with such an initiator. For the preparation of larger molecules, a two-step process is usually employed. In the first step, a product having an equivalent weight of from about 150 to about 750 is prepared, and in the second step this is reacted further with propylene oxide to prepare the higher molecular weight product.

The alkylene oxides useful in this invention are ethylene oxide, propylene oxide and 1,2-butylene oxide. Ethylene oxide and propylene oxide are preferred for this invention and these reactants are used in the examples herein. More than one alkylene oxide may be added to the reaction mixture as deemed necessary by one skilled in the art practicing this invention.

The amino alcohol adducts of the present invention are the reaction product of an epoxy resin and an amino alcohol of the formula:

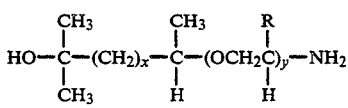

wherein:
x ranges from 1 to 4, preferably 1;
y ranges from 1 to 40, preferably 1 to 10; and
R is an alkyl radical of from 1 to 4 carbon atoms, preferably a linear alkyl, most preferably methyl.

Formation of the alcohols is described according to Applicant's copending application Ser. No. 06/731,195 filed on even date, held allowable.

A glycol, such as hexylene glycol is reacted with from about 1 to about 40 moles of alkylene oxide (e.g. propylene oxide, butylene oxides or mixtures thereof) in basic solution (e.g. sodium hydroxide, potassium hydroxide and the corresponding hydrides and alkoxides) to form a polyoxyalkylene polyether glycol intermediate. The reaction is suitably conducted at a temperature of about 80° C. to about 150° C. under modestly elevated pressure.

The intermediate is then reductively aminated in the presence of hydrogen and ammonia using a nickel, copper, chromia catalyst of the type disclosed by Yeakey in U.S. Pat. No. 3,654,370. Such catalysts are described, for example, in U.S. Pat. No. 3,152,998, both patents incorporated herein by reference. The reaction is carried out at a temperature of about 200° C. to 250° C. and a pressure of 2000 psig to 4000 psig optionally in a solvent, for example, aqueous ammonia in 20 to 30 mole excess.

The tertiary hydroxyl group of the glycol will neither alkoxylate nor aminate and the amino alcohols of the present invention are thereby formed.

The amino alcohol-epoxy resin adduct is formed by reacting the resin with the amino alcohol at a temperature of 100° C. to 150° C. Preferably the amino alcohol/epoxy resin mole ratio is 4/1 to 1/1. This adduct is then reacted with the alkoxylated initiator with continuous alkylene oxide addition. The final modified amino polyol has a molecular weight in the range of about 2000 to 7000. Preferably the amino alcohol-epoxy resin adduct comprises 0.5 to 10 wt % of the modified amino polyol.

It is anticipated that a wide variety of epoxy resins would be useful in practicing this invention. The vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred. The diglycidyl ether of bisphenol A is used in the examples herein. Some of these epoxy resins are known in the trade as "Epon" resins and may be obtained from Shell Chemical Co.

A widely used class of polyepoxides which are useful according to the instant invention includes the resinous epoxy polyethers obtained by reacting an epihalohydrin, such as epichlorohydrin and the like, with either a polyhydric phenol or a polyhydric alcohol. An illustrative, but by no means exhaustive, listing of suitable dihydric phenols includes
4,4'-isopropylidene bisphenol,
2,4'-dihydroxydiphenylethylmethane,
3,3'-dihydroxydiphenyldiethylmethane,
3,4'-dihydroxydiphenylmethylpropylmethane,
2,3'-dihydroxydiphenylethylphenylmethane,
4,4'-dihydroxydiphenylpropylphenylmethane,
4,4'-dihydroxydiphenylbutylphenylmethane,
2,2'-dihydroxydiphenylditolylmethane,
4,4'-dihydroxydiphenyltolymethylmethane and the like.

Other polyhydric phenols which may also be coreacted with an epihalohydrin to provide these epoxy polyethers are such compounds are resorcinol, hydroquinone, substituted hydroquinones, e.g., methylhydroquinone, and the like.

Among the polyhydric alcohols which can be coreacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g. polyethylene glycols, polypropylene glycols, triglycerol, dipentaerythritol and the like, polyallyl alcohol, polyhydric thioethers, such as 2,2',3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K, *Handbook of Epoxy Resins,* McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The reaction conditions of temperature and pressure may be selected by the invention practitioner to meet certain specifications required by the polyol for a particular use. The examples herein use a pressure of about 50 psig and a temperature of about 50° C. to 150° C. as representative conditions for the making of modified polyols that would be useful in flexible foams. The amount of epoxy resin to be added to the reaction mixture should be such that the epoxy equivalents present are less than half of the hydroxyl functionality equivalents present in the reaction mixture. Too many epoxy equivalents in relation to the hydroxyl equivalents may cause the epoxy resin to gel by cross-linking with itself. As a result a large excess of hydroxyl equivalents may be used in the reaction mixture and still be within the spirit and scope of this invention. The modified polyol resulting from the method of this invention would preferably have a molecular weight in the range of 2000 to 7000. It is conceivable that higher molecular weight modified polyols could be prepared by the methods of this invention.

EXAMPLE 1

EPON ® 828 (575 g, 1.5 mole) was charged into a one-liter resin flask equipped with a stirrer, nitrogen inlet, and thermometer and heated to 125° C. The amino alcohol (275 g, 0.75 mole) was then added slowly, keeping the temperature at 125°–130° C. The hexylene glycol based amino alcohol (lot 5663-83-3) had the following properties: Total acetylatables, meq/g 2.96, total amine, meq/g 2.77, primary amine, meq/g 2.72. The reaction mixture was digested two hours at 125° C. after the amino alcohol addition was completed. The finished product was a light yellow viscous liquid which had the following properties:

| Sample no. | 5926-7 |
|---|---|
| Properties | |
| Epoxide content, meq/g | 2.71 |
| Water, wt % | 0.05 |
| Secondary + tertiary amine, meq/g | <0.01 |
| Total amine, meq/g | 0.90 |

EXAMPLE 2

Into a ten-gallon kettle was charged 5.0 lb of a 600 m.w. propylene oxide (PO)/ethylene oxide (EO) adduct of glycerin (alkalinity, mg KOH/g 25.56). The reactor was then thoroughly purged with prepurified nitrogen and heated to 105° C. A mixture of 10.5 lb PO and 0.4 lb EO was then added at 105°–110° C. at 50 psig. After digestion to an equilibrium pressure, 1.15 lb of the amino alcohol-epoxy resin adduct of Example 1 was slowly added to the reactor. Without digestion, a mixture of 10.5 lb of PO and 0.4 lb of EO was added at 105°–110° C. at 50 psig. The polyol was then capped with 0.8 lb PO and digested to an equilibrium pressure. The alkaline product was then neutralized at 95° C. by stirring with 348 g magnesium silicate which was added as an aqueous slurry. Di-t-butyl p-cresol (52.2 g) and octylated diphenylamine (7.8 g) were also added at this time. The neutralized product was then vacuum stripped to a minimum pressure at 100° C., nitrogen stripped and filtered. The finished product had the following properties:

| Sample no. | 5931-41 |
|---|---|
| Properties | |
| Acid no., mg KOH/g | 0.008 |
| Hydroxyl no., mg KOH/g | 57.1 |
| Water, wt % | 0.05 |
| Unsaturation, meq/g | 0.024 |
| pH in 10:6 isopropanol-water | 7.7 |

| Sample no. | 5931-41 |
|---|---|
| Color, Pt—Co | <50 |
| Potassium, ppm | 0.2 |
| Sodium, ppm | 0.2 |
| Peroxide, ppm | 1.1 |
| Viscosity, °F., cs | |
| 77° | 907 |
| 100° | 447 |

EXAMPLE 3

This example will demonstrate that higher levels of the amino alcohol-epoxy resin (Epon 828) adduct of Example 1 can be incorporated into polyols than the epoxy resin alone. This serves to minimize the chance of gelation in the reaction.

In these experiments, various levels of the amino alcohol-epoxy resin adduct were reacted with an 1815 m.w. PO/EO adduct of glycerin which had an alkalinity of 8.26 mg KOH/g. This corresponds to the midpoint of PO/EO addition (step 1) as described in Example 2. Viscosities of the resultant products are showing the following table:

| Sample No. | 5451-88 | 5451-90 | 5451-91 | 5895-57A | 5895-57B |
|---|---|---|---|---|---|
| Amino alcohol-EPON ® 828 adduct of Ex. 1, wt. % | — | — | — | 5.66 | 7.4 |
| Epon 828, wt % | 5.66 | 7.4 | 9.1 | — | — |
| Viscosity, 77° F., cps | 4177 | 17846 | Gelled | 4521 | 2707 |

EPON ® 828 is the diglycidyl ether of bisphenol A, the condensation product of epichlorohydrin and bisphenol A, manufactured by Shell Chemical Co.

EXAMPLE 4

This example will show the use of the amino alcohol-epoxy resin modified polyol of Example 2 in the preparation of polyurethane flexible foam. It will further show the improved properties of foams made from this polyol as compared to a 3000 m.w. epoxy resin-modified polyol (THANOL ® F-3050; Texaco Chemical Co.).

Formulations, details of preparation and properties are shown in the following table:

| Foam No. | 5895-79D | 5895-80B | 5895-79E | 5895-80A |
|---|---|---|---|---|
| Formulation, pbw | | | | |
| Amino alcohol-epoxy resin modified polyol of Example 2 | 100 | 100 | — | — |
| 3000 m.w. epoxy resin-modified polyol[a] | — | — | 100 | 100 |
| Water | 4.0 | 4.0 | 4.0 | 4.0 |
| L-711 silicone[b] | 1.0 | 1.0 | 1.0 | 1.0 |
| 50% stannous octoate[c] | 0.3 | 0.2 | 0.3 | 0.2 |
| Thancat TD-33[d] | 0.3 | 0.3 | 0.3 | 0.3 |
| Toluene diisocyanate | 49.7 | 49.7 | 49.7 | 49.7 |
| Isocyanate index | 1.05 | 1.05 | 1.05 | 1.05 |
| Details of Preparation | | | | |
| Cream time, sec. | 10 | 12 | 10 | 12 |
| Rise time, sec. | 98 | 97 | 104 | 123 |
| Properties | | | | |
| Density, pcf | 1.41 | 1.59 | 1.49 | 1.57 |
| Chatillon gauge, reading, 25%, lb | 4.6 | 4.8 | 4.25 | 4.1 |
| Tensile, psi | 11.3 | 13.0 | 12.2 | 10.6 |
| Elongation, % | 120 | 100 | 120 | 100 |

-continued

| Foam No. | 5895-79D | 5895-80B | 5895-79E | 5895-80A |
|---|---|---|---|---|
| Tear, pli | 1.05 | 1.1 | 1.1 | 1.1 |
| Compression set | | | | |
| 50% | 8.8 | 5.3 | 7.4 | 8.5 |
| 90% | 9.0 | 6.0 | 9.3 | 8.0 |

[a] THANOL® F-3050, a product of Texaco Chemical Co.
[b] A product of Union Carbide Chemical Co.
[c] T-10 catalyst; M&T Chemicals
[d] 33% triethylenediamine in propylene glycol; a product of Texaco Chemical Co.

Many modifications and variations of the method of the invention as set forth herein may be made without departing from the spirit and scope thereof, and therefore, only such limitations should be imposed as are indicated in the claims set out below.

What is claimed is:

1. A modified amino polyol for use in preparing flexible polyurethane foams, the modified polyol produced by reacting:
   (1) an initiator having an active hydrogen functionality of from 3 to 4,
   (2) one or more alkylene oxides,
   (3) an amino alcohol adduct in such a manner that the adduct is added internally along the length of the polyol chain, the amino alcohol adduct being the reaction product of:
      (a) an epoxy resin and
      (b) an amino alcohol of the formula:

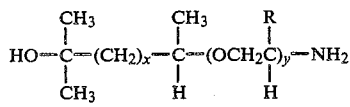

wherein:
   x ranges from about 1 to 4,
   y ranges from about 1 to 40, and
   R is an alkyl radical of from 1 to 4 carbon atoms.

2. The modified amino polyol of claim 1 wherein in the amino alcohol adduct the mole ratio of amino alcohol/epoxy resin ranges from about 4/1 to 1/1.

3. The modified amino polyol of claim 1 wherein the amino alcohol adduct comprises about 0.5 wt % to 10.0 wt % of the modified amino polyol.

4. The modified amino polyol of claim 1 wherein the sum of the molecular weights of the initiator, alkylene oxides and amino alcohol adduct is about 2000 to 7000.

5. The modified amino polyol of claim 1 wherein the alkylene oxides are a mixture of ethylene oxide and propylene oxide.

6. The modified amino polyol of claim 1 wherein in the amino alcohol, x is about 1.

7. The modified amino polyol of claim 1 wherein in the amino alcohol, y is about 1 to 10.

8. The modified amino polyol of claim 1 wherein R is methyl.

9. The modified amino polyol of claim 1 wherein in the amino alcohol, x is about 1, y is about 1 to 10 and R is methyl.

10. The modified amino polyol of claim 1 wherein the initiator is glycerol.

11. A method for producing a flexible polyurethane foam which comprises:
   A. making a modified polyol by reacting:
      (1) an initiator having an active hydrogen functionality of from 3 to 4,
      (2) one or more alkylene oxides,
      (3) an amino alcohol adduct in such a manner that the adduct is added internally along the length of the polyol chain, the amino alcohol adduct being the reaction product of:
         (a) an epoxy resin and
         (b) an amino alcohol of the formula:

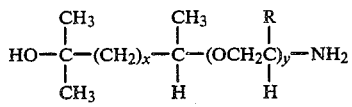

wherein:
   x ranges from about 1 to 4,
   y ranges from about 1 to 40, and
   R is an alkyl radical of from 1 to 4 carbon atoms; and
   B. reacting said modified polyol with an organic polyisocyanate and one or more suitable foam catalysts in the presence of a blowing agent.

12. The method of claim 11 wherein in the amino alcohol adduct the mole ratio of amino alcohol/epoxy resin ranges from about 4/1 to 1/1.

13. The method of claim 11 wherein the amino alcohol adduct comprises about 0.5 wt % to 10.0 wt % of the modified amino polyol.

14. The method of claim 11 wherein the sum of the molecular weights of the initiator and the alkylene oxides is about 2000 to 7000.

15. The method of claim 11 wherein the alkylene oxides are a mixture of ethylene oxide and propylene oxide.

16. The method of claim 11 wherein in the amino alcohol, x is about 1.

17. The method of claim 11 wherein in the amino alcohol, y is about 1 to 10.

18. The method of claim 11 wherein in the amino alcohol, R is methyl.

19. The method of claim 11 wherein in the amino alcohol, x is about 1, y is about 1 to 10 and R is methyl.

20. The method of claim 11 wherein the initiator is glycerol.

* * * * *